United States Patent [19]

Tillett

[11] Patent Number: 5,706,612
[45] Date of Patent: Jan. 13, 1998

[54] SELF LEVELING FLUSH SLIDE-OUT FLOOR

[75] Inventor: Bryan E. Tillett, Smith Center, Kans.

[73] Assignee: Peterson Industries, Inc., Smith Center, Kans.

[21] Appl. No.: 780,743

[22] Filed: Jan. 8, 1997

[51] Int. Cl.⁶ ............................................. E04B 1/344
[52] U.S. Cl. ................................... 52/67; 296/171
[58] Field of Search ................... 52/67, 64; 296/165, 296/171, 175, 26

[56] References Cited

U.S. PATENT DOCUMENTS

| | | | |
|---|---|---|---|
| 2,902,312 | 9/1959 | Ferrera | 52/67 X |
| 3,106,750 | 10/1963 | Jarman | 52/67 |
| 4,312,159 | 1/1982 | Paul | 52/67 |
| 5,491,933 | 2/1996 | Miller et al. | 52/67 |
| 5,577,351 | 11/1996 | Dewald, Jr. et al. | 52/67 |
| 5,586,802 | 12/1996 | Dewald, Jr. et al. | 52/67 X |

Primary Examiner—Robert Canfield
Attorney, Agent, or Firm—Richard W. Hanes

[57] ABSTRACT

An extensible surface area structure for expanding the area of a primary surface, comprising, a frame, a primary surface area supported by the frame and having an outer edge, an extensible surface area having an outer an inner edge and adapted for temporary storage in a superimposed position on top of the primary surface area, at least one extensible support beam secured to the frame at its first end, a leveling assembly secured to the extensible support beam at its second end and attached to the outer edge of the extensible surface area.

8 Claims, 4 Drawing Sheets

SELF LEVELING FLUSH SLIDE-OUT FLOOR

BACKGROUND

The present invention relates to extensible area floors and rooms and the support mechanism therefor which produces and maintains a level and flush relationship between the extended area floor and the primary floor to which the extension is made.

There exist many circumstances where a primary portable flat supporting surface is transported, along with one or more additional surface arrays, to be arranged at the point of use in such a manner that the base surface, or floor, area is extended. In some cases the additional array of flat surface material is a separate structure from the primary one and is attached to it in a co-planer relationship by any number of traditional means which will adequately support the extended surface. In other cases, the extended area surface is transported in a stacked relation to the primary surface and is slidingly attached thereto. On assembly for use, the extended area is moved outwardly of the primary surface area on a sliding support, however the extensible area surface remains in the same plane as that in which it was stacked over the primary area, thus creating a dual level surface.

One particular application of extensible area surfaces is in the vehicular trailer industry where slide-out rooms expand the floor area of the trailer. In such an environment a virtual separate room is stored within the trailer for transport and then slid laterally out of the trailer upon arrival at the point of occupancy. Such applications require that the floor of the expanding room area be stored for transport in the "packed" position on top of the floor of the primary portion of the trailer. When the extended area portion is slid laterally outwardly from the main portion of the trailer, the floor of the extended area is traditionally above the level of the main floor, creating inconvenience and a tripping hazard at the point of intersection. Some attempts have been made to solve the problem by providing mechanisms which will lower the extensible floor to make it flush with the main floor. U.S. Pat. No. 5,491,933 to Mahlon A. Miller is illustrative. So far, however, the mechanisms to affect a smoothly operating and inexpensive floor leveling device for a heavy structure, such as an extended room with furniture, have not materialized.

It is therefore, the primary object of the present invention to provide a leveling mechanism for use with a slidable and extensible area surface, such as a floor, which will cause the extensible area to be level and flush, in its extended position, with a primary floor, whose area is being enlarged.

SUMMARY OF THE INVENTION

An extensible floor area, including appropriate walls and ceiling, is stored for transportation, or other temporary use, on top of a primary floor area in a vehicular trailer. In order to extend the trailer's floor area, a slide-out room with its floor is moved laterally off of the primary floor by means of one or more extensible cantilevered beams, which are supported by the framework which sustains the primary floor. At such time as the extensible floor has reached its full outward extension, the mechanism of the present invention allows the extensible floor to be lowered to a level which is flush with the level of the primary floor. When the extensible floor is retracted to its stored position, its level is raised by the mechanism of the present invention so that the floor assumes a higher level, commensurate with its storage position on top of the primary trailer floor.

In order to accomplish the leveling of the extensible floor so that it becomes flush with the primary trailer floor, an outer leveling mechanism is attached to the distal end of each of the extensible cantilevered support beams and is also secured to the bottom outer edge of the slide-out room floor. Each of the plurality of leveling mechanisms comprises a vertically slidable coupling having springs which bias the mechanism into a closed, elevated, or storage mode. One movable element of the slidable coupling is secured to the applicable cantilevered support beam while the other movable element of the coupling is secured to the outer, or distal, edge of the extensible floor.

The interior edge of the slide-out room floor is disposed over and bears against on one or more rollers for reduced friction movement of the floor when extending or retracting the floor. When the floor is fully extended, the inner edge of the floor drops off of the roller and descends into a recess so that the inner edge of the extensible floor becomes flush with the primary trailer floor and level with the outer edge of the extensible floor which has been lowered through the operation of the leveling mechanisms.

DETAILED DESCRIPTION

The description of the preferred form of the invention will be made in terms of the invention's application to a lateral slide-out expansion cubicle, or room 2, in a vehicular trailer 3 or similarly constructed vehicle, however the scope of the invention is limited only by the claims, as properly interpreted.

Figure 1:
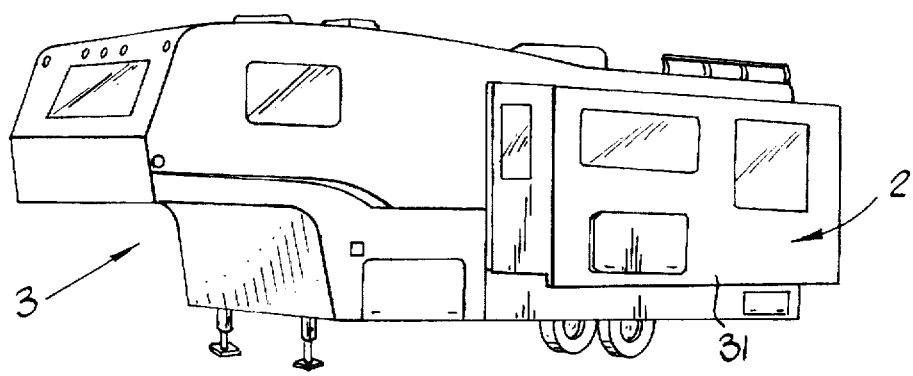
FIG. 1 is a perspective view of a typical vehicular trailer with a lateral slide-out extensible room of the type which would utilize the mechanism of the present invention to level the floor of the slide-out room with the primary floor of the trailer when the room was extended.
Figure 3:
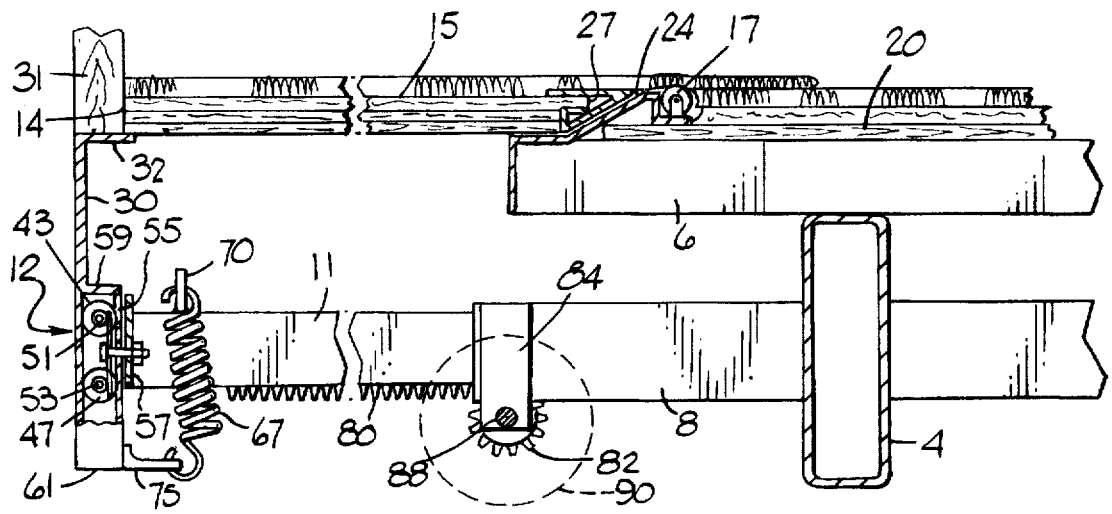
FIG. 3 is a fragmentary cross sectional view taken through the rearward outer leveling assembly and the main trailer frame, showing the slide-out room in its fully extended position.
Figure 4:
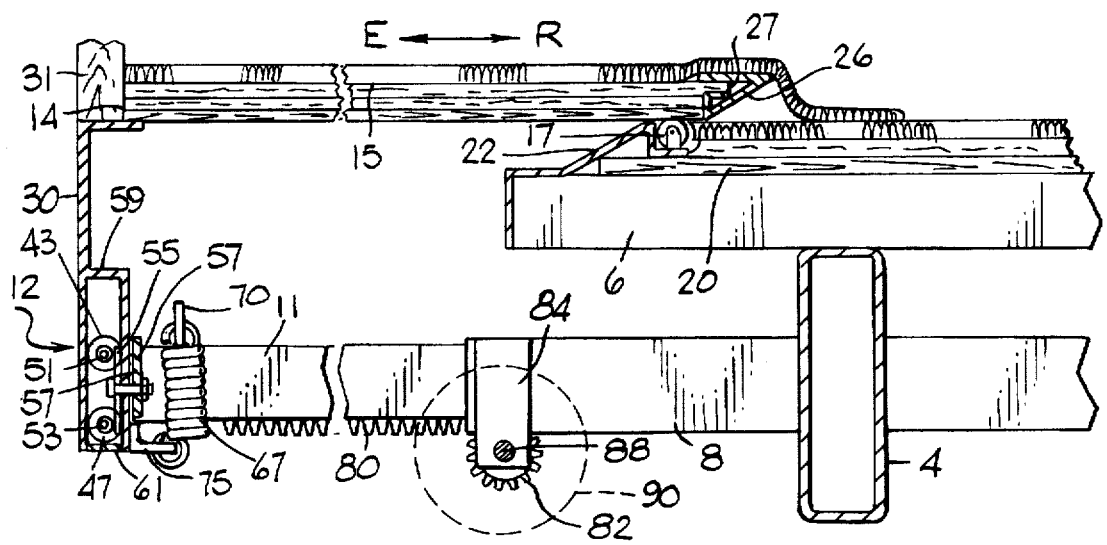
FIG. 4 is a fragmentary cross sectional view taken through the rearward outer leveling assembly and the main trailer frame, showing the slide-out room in a partially retracted position with the extensible slide-out room floor elevated to its storage position over the primary trailer floor.
Figure 2:
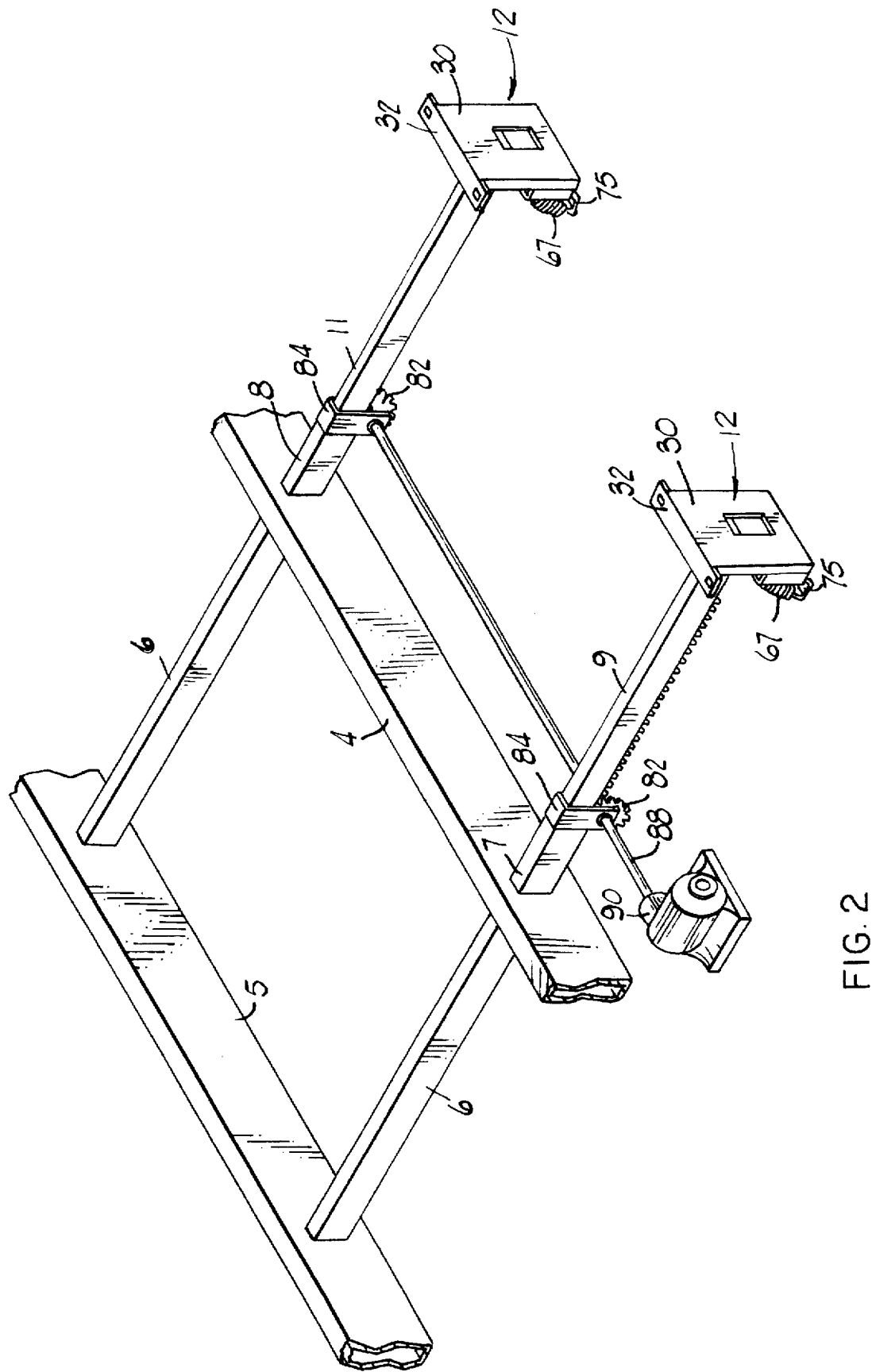
FIG. 2 is a fragmentary perspective view of the main vehicular trailer frame and the laterally disposed cantilevered beams which support the extended slide-out room. For reference purposes, the rear of trailer is the upper portion of the drawing.
Figure 2A:
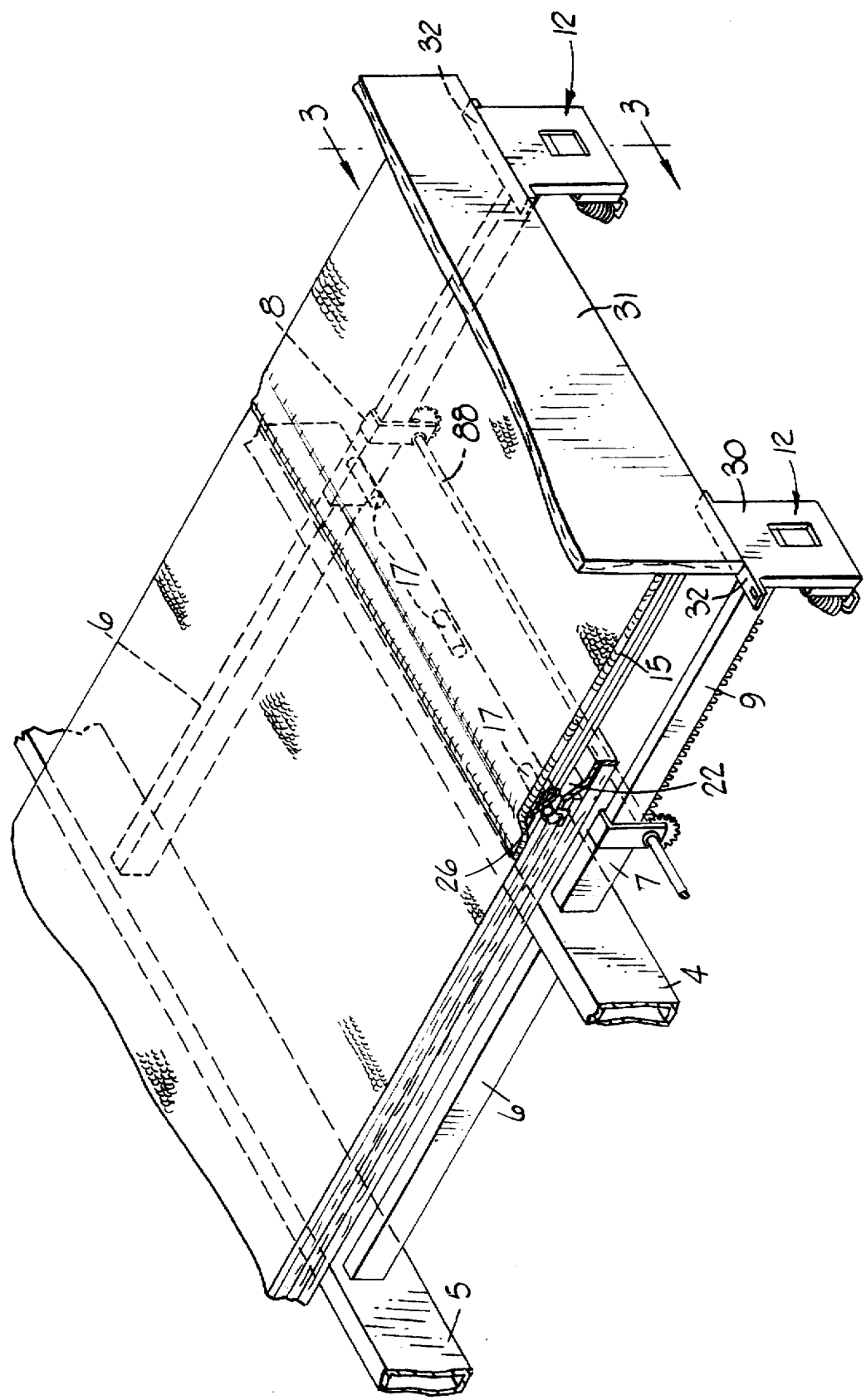
FIG. 2A is a view similar to that of FIG. 2, but further including a fragmentary showing of the primary trailer floor, the extensible floor and the outside wall of the slide-out room.
Figure 5:
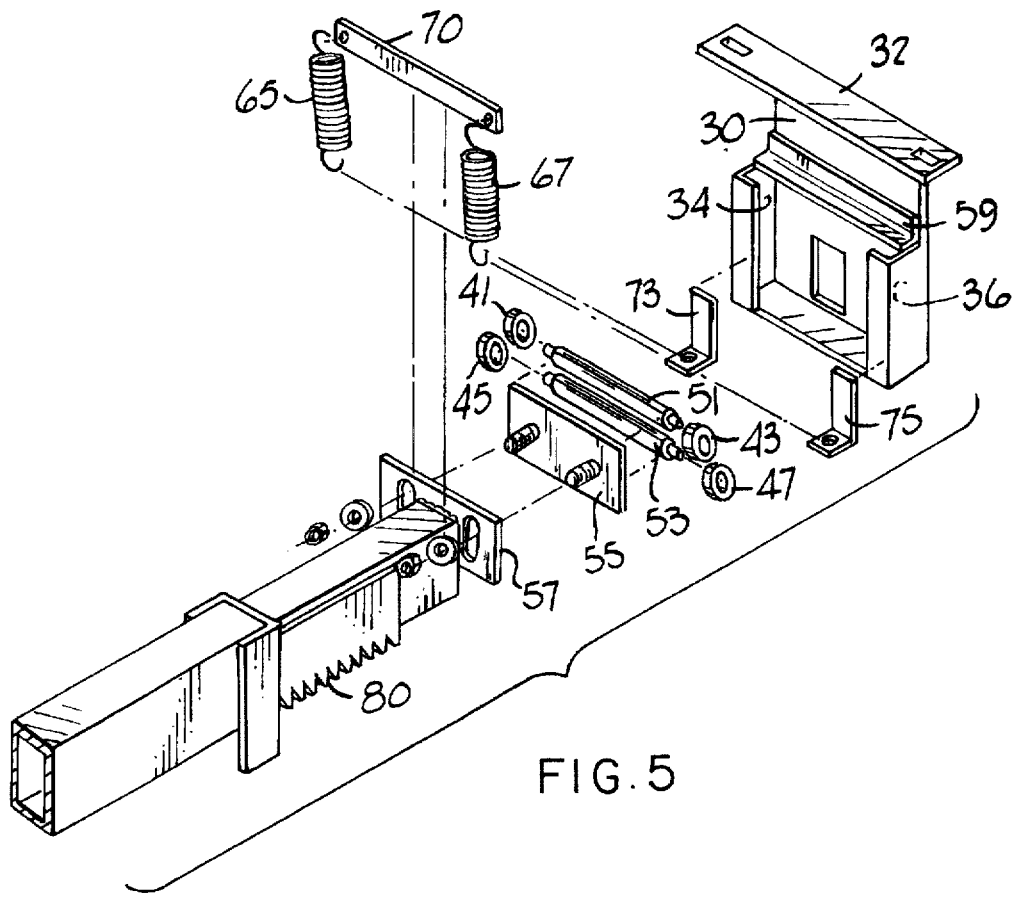
FIG. 5 is an enlarged fragmentary exploded perspective view of a typical one of the outer leveling mechanisms.
Figure 6:
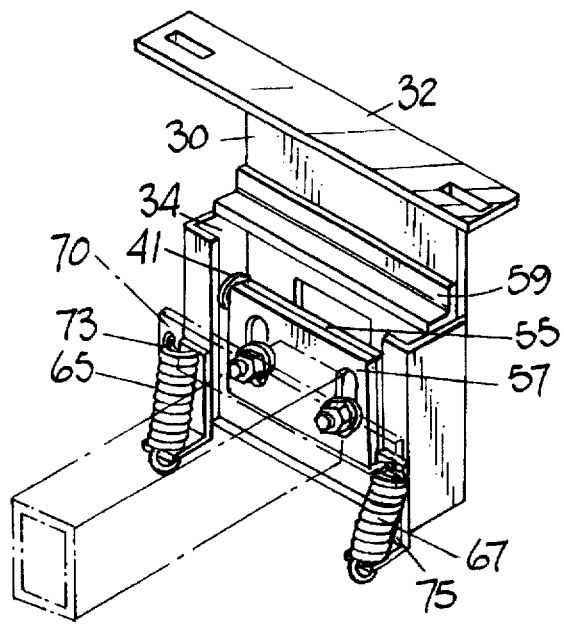
FIG. 6 is a perspective view of a typical one of the outer leveling mechanisms shown as it would be seen when the slide-out room is retracted in its storage position.

The supporting frame of a typical trailer or vehicle includes a pair of spaced apart longitudinal beams 4 and 5, interconnected by reinforcing cross members. Floor joists 6 of the main trailer area are perpendicular to and supported by the longitudinal beams 4 and 5. Referring to FIGS. 3 and 4, a single one of the supporting frame beams 4 is shown in cross section. To one or both of the frame beams 4 and 5 are attached a pair of spaced apart cantilevered beams 7 and 8 which are perpendicular to the beams 4 and 5 and extend laterally outwardly from the beam 4. The cantilevered beams 7 and 8 are each constructed from rectangular steel tubing and contain therein telescopically disposed and slidable inner rectangular steel support tubes 9 and 11 respectively. Outer leveling assemblies, generally referred to by reference numeral 12, interconnect the most outwardly, or distal, edge 14 of the extensible area floor 15 with the telescoping floor support tubes 9 and 11.

Not having the supporting benefit of the floor joists 6, the slide-out floor 15 is constructed so as to provide its own support and rigidity. In the partially stored or packed position, as depicted in FIG. 4, the inner portion of the floor 15 is supported by one or more rollers 17 whose axles are attached to the floor joist or an element of the primary floor 20. The rollers are positioned at the outward edge of the primary floor 20, so that their axis of rotation is perpendicular to the direction of travel of the floor 15 as it is driven outwardly to its extended position, as shown in FIG. 3. Laterally outwardly of the roller 17, a sloping aluminum sheet which is rigidly attached to the floor joists 6 forms a threshold 22 which becomes part of the joint 24 between the primary floor 20 and the extensible floor 15 when the extensible floor is in the extended position, as seen in FIG. 3. To properly mate the inner edge of the extensible floor with the threshold 22, a molding 26, comprising an elongated generally triangularly shaped aluminum extrusion, is secured to the edge 27 of the extensible floor 15.

In operation, as the extensible floor is moved outwardly from its stored position over the primary floor and reaches its fully extended position, the inner edge molding 26 of the extensible floor will run over the rollers 17 and slide down the inclined face of the threshold 22 into a provided recess and thereby into the flush position shown in FIG. 3. When the extensible floor is in its extended position the flat and inclined underside of the molding 26 lies in face to face relationship with the sloped face of the threshold 22. In addition to forming a suitable junction between the edges of the two floors, the mutually facing sloped surfaces of the molding 26 and the threshold 22 provide a mutual camming action to lift the inner edge of the extensible floor 15 up and out of its recessed flush position when the retracting apparatus pushes the extensible floor inwardly toward the threshold.

To make the extended floor level, the outer edge of the floor is depressed through the operation of the two leveling assemblies 12, which will now be explained. Each of the assemblies 12 comprises a vertically oriented flat base plate 30 having an upper inwardly bent flange 32 to which the outward edge of the extensible floor 15 and the outside wall 31 of the room 2 are secured. The lower portion of the base plate 30 carries at each of its lateral edges a "U" shaped channel 34 and 36. The channels form tracks in which pairs of rollers 41, 43 and 45, 47 may travel up and down. The pairs of rollers are supported for rotation by spindles 51 and 53 respectively, which are secured to a mounting plate 55. The mounting plate is attached by bolts to a mating face plate 57, which is welded to the outer end of the inner support tube 11. In the case of the matching assembly 12, its face plate 57 is welded to the outer end of the inner support tube 9. An equally acceptable alternative would be to weld the spindles 51 and 53 directly to the face plate 57 and thereby eliminate the need for the mounting plate 55, which may be provided in some situations for convenience in assembling the leveling apparatus. A stop bar 59 is secured to the top of the channels 34 and 36 to prevent the rollers from coming out of the top end of the channels. A similar stop 61 is provided at the bottom ends of the channels 34 and 36 to prevent the rollers from coming out of the tracks. The stop 61 may be nothing more than a turned in edge of the base plate 30.

Although the described embodiment of the invention utilizes a pair of channel tracks with enclosed wheels to provide a sliding coupling between the base plates 30 of the leveling assemblies 12 and the inner support tubes 9 and 11, other coupling means are deemed to be within the scope of this invention. For example, mechanisms which could be substituted for the wheels and channel tracks include a variety of known guides and slides, such as telescoping members, guide bars within a journal and "V" beds and guides, among others.

Thus, it is seen that the leveling assemblies 12 provide a vertically adjustable coupling between the extensible floor and the horizontally disposed telescoping support beams wherein the base plate 30, and the attached floor edge, is free to move up and down, within limits, with respect to the inner support tubes 9 and 11, thus leveling the floor and making it flush with the surface of the main floor of the trailer. Obviously, the weight of the extensible floor and the integral walls, ceiling and furniture within the slide out area, would tend to keep the base plate in its lowermost position, regardless of whether the extensible floor was extended or retracted. Since it is desirable that the floor should be level when it is in the packed position, over the main trailer floor, it is necessary that the base plate move upwardly to raise the outer edge of the extensible floor during the retraction, or storing, process. This upward movement of the outer portion of the extensible floor takes place as the result of inward movement of the floor. As the extensible floor moves inwardly, the rollers 17 become a fulcrum and when a sufficient length of the floor has passed inwardly over the rollers, its weight overcomes the weight of that portion of the extensible floor which is outwardly of the rollers, causing the whole extensible floor to pivot so that the inward portion thereof settles into a position of rest, supported by the main trailer floor.

It has been found however, that this storing operation can advantageously be assisted by the action of a pair of helical tension springs 65 and 67. In the embodiment shown, a laterally extending cross bar 70, welded to the top of the inner support tube 11, supports the upper end of the helical tension springs 65 and 67. Support brackets 73 and 75 depend from the channels 34 and 36 and secure the bottom ends of the springs 65 and 67. The two springs provide a biasing force to assist in the raising of the base plate 30 and the attached extensible floor, with respect to the inner support tube position, during the inward movement of the extensible floor. Raising the outer floor edge as early in the storage process as possible, with the help of the tension springs is preferred over the alternative of waiting until the floor pivots naturally, due to the magnitude of the inside moment arm.

When the extensible floor is pulled from its stored position, that is, slid out to its extended position, as shown in FIG. 3, the weight of the slide-out room, coupled with the increasing moment arm of the extending floor, creates a downward force on the supporting base plate 30 of each of the leveling assemblies 12 sufficient to overcome the closing tension force supplied by the tension springs 65 and 67. This force pushes the base plates 30 downwardly, permitting the extensible floor 15 to level and be flush with the main floor 20 of the trailer 3. Conversely, when the floor is retracted, the spring forces take over and raise the base plates 30 and the attached floor when the moment arm of the withdrawing unit becomes insufficient to maintain the downward force necessary to overcome the upward tension force of the springs.

Extension and retraction movement of the slide-out room is procured traditionally. Each of the inner support tubes 9 and 11 are provided with a gearing rack 80 along their bottom surfaces. The racks engage pinion gears 82 which are journalled for rotation within mounting brackets 84 secured to the cantilevered beams 5 and 7. A drive shaft 85 interconnects the two pinion gears 82. A drive shaft 88 is coupled to the output of an electrical drive motor in a conventional manner. The motor operates to turn the drive shaft and rotate the pinion gears to either extend or retract the inner support tubes 9 and 11.

I claim:

1. An extensible surface area structure for expanding the area of a primary surface, comprising, a frame, a primary surface area supported by the frame, an extensible surface area having an outer an inner edge and adapted for temporary storage in a superimposed position on top of the primary surface area, at least one extensible support beam secured laterally to the frame, a leveling assembly secured to the extensible support beam and comprising, a base member attached to the outer edge of the extensible surface area, an interface member attached to the distal end of the extensible support beam, a slidable coupling between the base member and the interface member, and biasing means interconnecting the base member and the extensible support beam to provide a force for positioning the base member at one position relative to the support beam.

2. The combination of claim 1 where the slidable coupling comprises, a pair of spaced apart opposed tracks carried by the base member, at least one wheel disposed to rotate on each of the tracks where the wheel is carried by the extensible support beam.

3. The combination of claim 2 and further including, at least one roller secured to the primary surface area for providing a rolling contact between the extensible surface area and the primary surface area.

4. The combination of claim 3 and further including, a sloping threshold member attached to an outer edge of the primary surface area outwardly from the roller.

5. The combination of claim 4 and further including, a molding member attached to the inner edge of the extensible surface area and having a sloped under surface which matches the slope of the threshold member.

6. An expandable housing structure comprising, a primary housing structure having a floor with at least one outer edge, an expandable area unit having a floor with inner and outer extremities and movable between a first housed position within the primary housing structure and a second position contiguous to the primary structure, where, in the housed position, the expandable area unit floor is superimposed over and is supported by the primary structure floor, and in the second position the floor of the expandable area unit is contiguous to and flush with the floor of the primary structure, and extension and retraction means comprising, at least one extensible beam attached to the primary housing structure and having an outer cantilevered end, a coupling, slidable in a plane perpendicular to the said floors, and interconnecting the outer extremity of the expandable area unit floor and the outer cantilevered end of the extensible beam, at least one roller carried by the primary housing structure proximate it outer edge and defining a rolling contact between the primary structure floor and the expandable area unit floor, a support shelf depressed from the level of the primary structure floor and carried by the primary structure outwardly of the roller and adapted to support the inner extremity of the expandable area unit floor in a position flush with the primary structure floor when the expandable unit is in its extended position.

7. The combination of claim 6 and further including, transition apparatus providing a juncture between the outer edge of the primary structure floor and the inner extremity of the expandable area unit floor, comprising, a sloping threshold surface attached to the outer edge of the primary structure floor, a molding having a sloping under surface which is disposed face to face with the sloping surface of the threshold when the expandable area unit floor is in its extended position.

8. In mobile living quarters comprising, a frame, a main floor supported by the frame, walls and ceiling attached to the main floor to form a living area, a retractable living area extension having a floor and mounted for movement from a retracted position over the main floor to an extended position where the floor of the living area extension is contiguous to the main floor and flush therewith, at least one beam, carried by the frame and laterally extensible from the frame, supporting the retractable living area extension, the improvement comprising, an interconnection between the extensible beam and the living area extension, which interconnection comprises a fixed member and a moveable member that are linearly slidable with respect to one another in a plane perpendicular to the floor of the living area extension between a raised retracted position and a lowered extended position, and wherein the interconnection includes means biasing the living area extension to one of the said two positions.

* * * * *